US011027202B2

(12) United States Patent
Sucharov et al.

(10) Patent No.: US 11,027,202 B2
(45) Date of Patent: Jun. 8, 2021

(54) COMPUTERIZED GAMING SYSTEM AND METHOD OF OPERATING THEREOF

(71) Applicant: PLAYTECH SOFTWARE LIMITED, British Isles (IM)

(72) Inventors: Leon Sucharov, Wrecclesham Farnham (GB); Toby Sucharov, Farnborough (GB); Valery Gelfman, Tallinn (EE); Jens Gustav Nilsson, Saltsjo-Boo (SE); Guy Gani, Tallinn (EE)

(73) Assignee: PLAYTECH SOFTWARE LIMITED, Douglas (IM)

( * ) Notice: Subject to any disclaimer, the term of this patent is extended or adjusted under 35 U.S.C. 154(b) by 0 days.

(21) Appl. No.: 16/527,123

(22) Filed: Jul. 31, 2019

(65) Prior Publication Data

US 2019/0351332 A1 Nov. 21, 2019

Related U.S. Application Data

(63) Continuation-in-part of application No. PCT/IL2018/050130, filed on Feb. 6, 2018.

(Continued)

(51) Int. Cl.
*A63F 13/77* (2014.01)
*A63F 13/63* (2014.01)

(52) U.S. Cl.
CPC .............. *A63F 13/77* (2014.09); *A63F 13/63* (2014.09)

(58) Field of Classification Search
CPC ................................ A63F 13/77; A63F 13/63
See application file for complete search history.

(56) References Cited

U.S. PATENT DOCUMENTS

| 2004/0106452 A1* | 6/2004 | Nguyen | G07F 17/32 |
| | | | 463/42 |
| 2007/0015564 A1* | 1/2007 | Walker | G07F 17/3227 |
| | | | 463/16 |

(Continued)

OTHER PUBLICATIONS

"Testing strategy for compliance with remote gambling and software technical standards", UK Gambling Commission, www.gamblingcommission.gov.uk/for-gambling-businesses/Compliance/Sector-specific-compliance/Remote-and-software/Remote-technical-standards-testing-strategy.aspx, 2020.

(Continued)

*Primary Examiner* — David L Lewis
*Assistant Examiner* — Shauna-Kay Hall
(74) *Attorney, Agent, or Firm* — Browdy and Neimark, PLLC

(57) ABSTRACT

There are provided a computerized gaming system and a method of operating thereof. There is also provided a method of using the gaming system to provide a service related to generating a game deployable to the gaming system, the method comprises: enabling a user to use the gaming system to generate a customized game engine data model (GEDM) meeting a user's specification of the game, wherein the customized game model is generated responsive to defining appropriate customizable math-related parameters in a unified GEDM applicable to any game runnable by the gaming system; generating, by the gaming system, a Game Engine Package comprising the customized GEDM and an executor thereof, wherein the executor is unified and applicable to any customized GEDM derived from the unified GEDM; and enabling the user to deploy the Game Engine Package to one or more instances of the gaming system.

17 Claims, 13 Drawing Sheets

Related U.S. Application Data

(60) Provisional application No. 62/575,707, filed on Oct. 23, 2017, provisional application No. 62/454,911, filed on Feb. 6, 2017.

(56) References Cited

U.S. PATENT DOCUMENTS

| | | | | |
|---|---|---|---|---|
| 2009/0143128 A1* | 6/2009 | Cautley | ............... | G07F 17/32 463/17 |
| 2009/0149246 A1* | 6/2009 | Opaluch | ............... | A63F 13/63 463/29 |
| 2009/0298576 A1* | 12/2009 | Nguyen | ............... | G07F 17/323 463/25 |
| 2013/0065691 A1 | 3/2013 | Gavish | | |
| 2014/0087355 A1 | 3/2014 | Collins, III | | |

OTHER PUBLICATIONS

"Testing strategy for compliance with remote gambling and software technical standards", UK Gambling Commission, www.gamblingcommission.gov.uk/PDF/Testing-strategy-for-compliance-with-remote-gambling-and-software-technical-standards.pdf, 2018.
"Standard Series GLI-19—Interactive Gaming Systems", Gaming Laboratories International LLC, Feb. 15, 2013.
Messaoudi Farouk et al: "Dissecting games engines: The case of Unity3D", 2015 International Workshop on Network and System Support for Games (Netgames), IEEE, Dec. 3, 2015 (Dec. 3, 2015), pp. 1-6, XPO32850087, DOI: 10.1109/NETGAMES.20157382990 [retrieved on Jan. 13, 2016] abstract * sections I and II *.

* cited by examiner

Figure 5

COMPUTERIZED GAMING SYSTEM AND METHOD OF OPERATING THEREOF

CROSS-REFERENCES TO RELATED APPLICATIONS

The present application claims benefit from International Application No. PCT/IL2018/050130 filed on Feb. 6, 2018 and claiming priority from U.S. Provisional Application No. 62/454,911 filed on Feb. 6, 2017 and U.S. Provisional Application No. 62/575,707 filed on Oct. 23, 2017, the applications incorporated hereby by reference in their entirety.

TECHNICAL FIELD

The presently disclosed subject matter relates to computerized gaming and, more particularly, to computerized gaming systems and methods of operating thereof.

BACKGROUND

The industry of computerized games is in the process of reshaping to providing games using service-oriented platforms. The actual game software can be stored on the hosting company's servers and further streamed to the player's device. "Game as a service (GaaS)" is not only about how games are played, but also how they are developed, deployed, and maintained. The GaaS model is becoming popular among game developers and publishers for creating and distributing their titles.

GENERAL DESCRIPTION

In accordance with certain aspects of the presently disclosed subject matter, there is provided a method of operating a computer-based gaming system. The method comprises: generating, by the gaming system, a customized game engine data model (GEDM) configured to represent a math of a given game, wherein the customized GEDM is derived from a unified game engine data model (GEDM) by defining customizable parameters meeting a user's specification and related to the math of the given game, and wherein the unified GEDM specifies a math unified for all customized GEDM derivable from the unified data model by defining the customizable parameters related to the math; generating, by the gaming system, a Game Engine Package comprising the customized GEDM and an executor thereof, wherein the executor is unified and applicable to any customized GEDM derivable from the unified data model; and deploying the Game Engine Package to one or more instances of the gaming system.

The Game Engine Package can be configured as a single sealed unit (e.g. a file) comprising a logic for a one or more games. The Game Engine Package can further comprise one or more plugins.

In accordance with further aspects of the presently disclosed subject matter, the method can further comprise: prior to deploying the Game Engine Package, generating by the gaming system a game client in accordance with the customized GEDM; and using the generated game client to enable a user to playtest the generated Game Engine Package. Generating the customized GEDM can comprise a refining phase of iteratively modifying the customized model.

In accordance with further aspects, the method can further comprise simulating, by the gaming system, an execution of the customized GEDM prior to generating the Game Engine Package.

In accordance with further aspects, the method can further comprise validating the Game Engine Package prior to deploying, wherein validating can be provided with the help of core services (e.g. random number generation, state persistence service, message routing service, regulatory services, etc.) supplied by the gaming system.

In accordance with further aspects, the method can further comprise deploying the Game Engine Package in a local environment capable of providing computerised gaming (e.g. retail environment, bingo environment, etc.)

In accordance with other aspects of the presently disclosed subject matter, there is provided a computerized method of providing a service related to generating a game deployable to a gaming system. The method comprises: enabling a user to use the gaming system to generate a customized game engine data model (GEDM) configured to represent a math of a given game, wherein the customized GEDM is derived from a unified game engine data model (GEDM) by defining customizable parameters meeting a user's specification and related to the math of the given game, and wherein the unified GEDM specifies a math unified for all customized GEDM derivable from the unified data model by defining the customizable parameters related to the math; generating, by a game system, a Game Engine Package comprising the customized GEDM and an executor thereof, wherein the executor is unified and applicable to any customized GEDM derivable from the unified data model; and enabling the user to deploy the Game Engine Package to one or more instances of the gaming system.

In accordance with further aspects, the method can further comprise: prior to deploying the Game Engine Package, generating by the gaming system a game client in accordance with the customized game model; and enabling the user to use the generated game client for playtesting the generated Game Engine Package.

In accordance with further aspects, enabling the user to generate the customized game model can comprise enabling the user to iteratively modify the customized model until the resulting game engine meets the user's specification of the game.

In accordance with further aspects, the method can further comprise simulating, by the gaming system, an execution of the customized game model prior to generating the Game Engine Package.

In accordance with further aspects, the method can further comprise enabling using the gaming system to validate the Game Engine Package prior to deploying, wherein the validation is provided with the help of core services supplied by the gaming system.

In accordance with further aspects, the method can further comprise enabling the user to deploy the Game Engine Package in a local environment capable of providing computerised gaming (retail environment or bingo environment).

In accordance with other aspects of the presently disclosed subject matter, there is provided a computerized gaming system configured to operate in accordance with any one of the aspects of the methods above and any suitable combination thereof.

In accordance with other aspects of the presently disclosed subject matter, there is provided a computer program product implemented on a non-transitory computer usable medium and comprising computer readable program code for performing method in accordance with any one of the aspects of above.

BRIEF DESCRIPTION OF THE DRAWINGS

In order to understand the invention and to see how it can be carried out in practice, embodiments will be described, by way of non-limiting examples, with reference to the accompanying drawings, in which:

Figure 5:
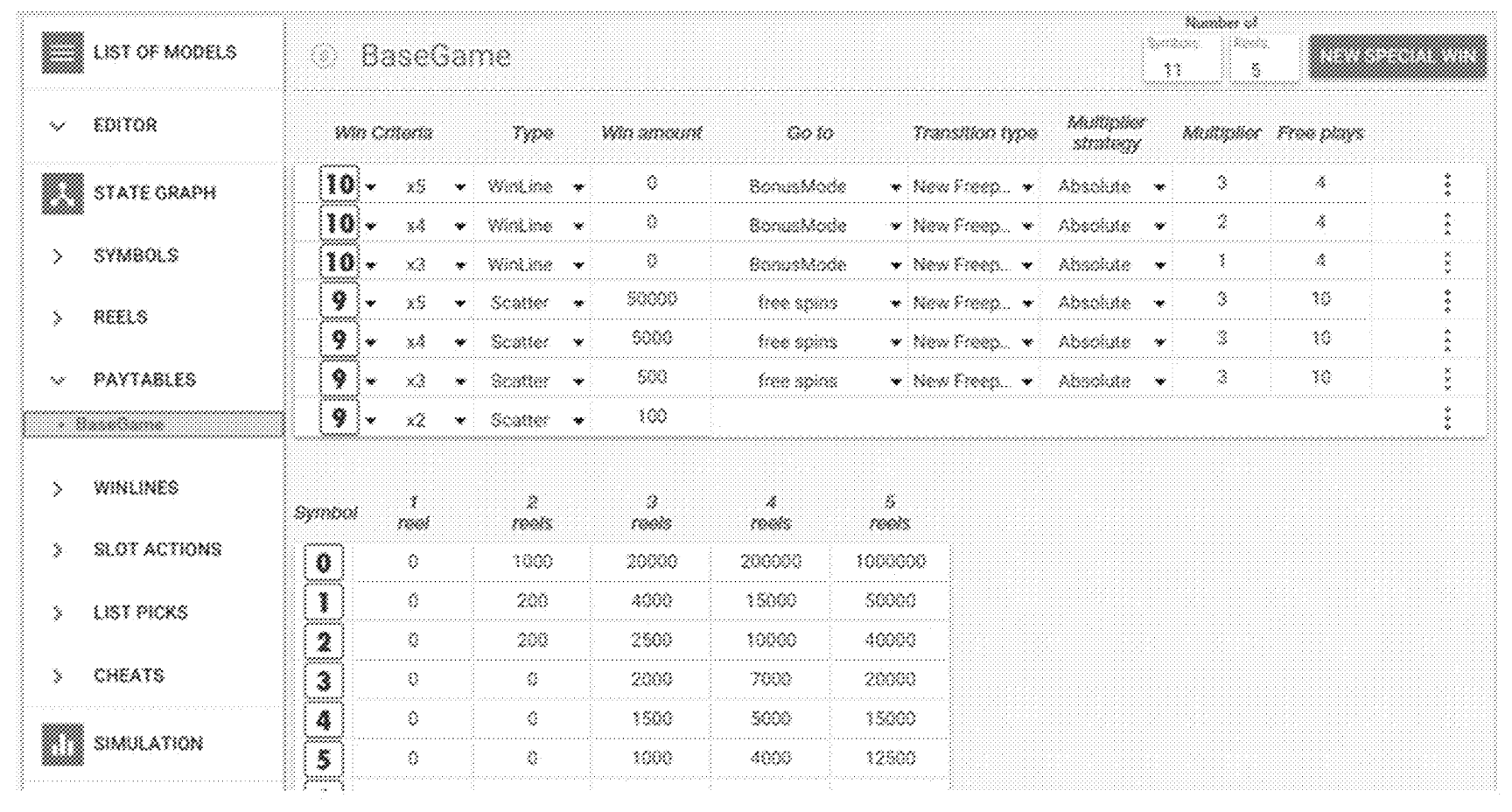

FIGS. 4-7 illustrate non-limiting examples of screenshots presenting customizable parameters of unified game engine data model (GEDM) generated in accordance with certain embodiments of the presently disclosed subject matter;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "generating", "creating", "validating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the gaming system disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
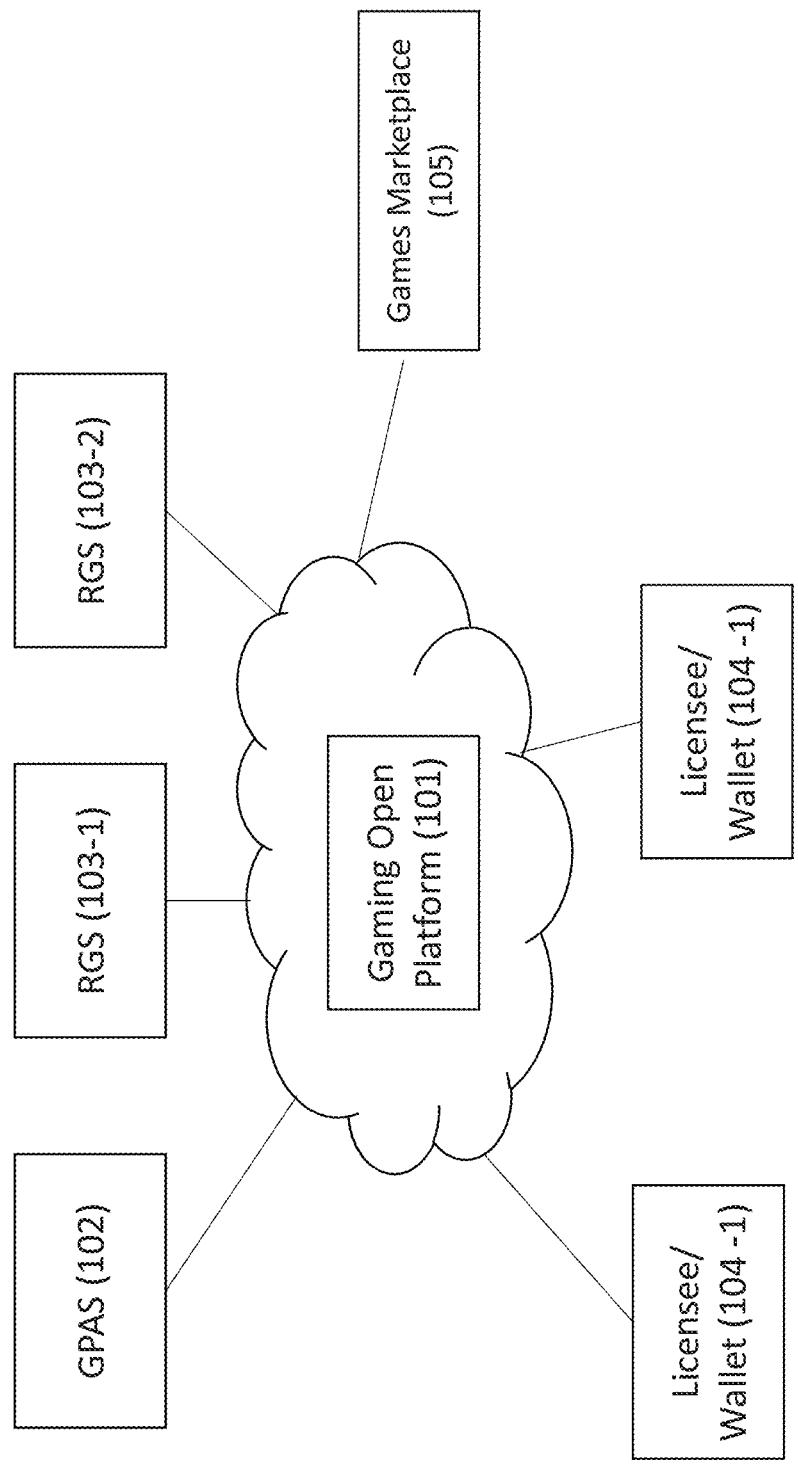
FIG. 1 illustrates a generalized block diagram of a computerized gaming environment in accordance with certain embodiments of the presently disclosed subject matter.

Bearing this in mind, attention is drawn to FIG. 1 illustrating a generalized diagram of a computerized gaming environment in accordance with certain embodiments of the currently presented subject matter.

Gaming Open Platform 101 is operatively connected to gaming system 102 configured in accordance with certain embodiments of the currently presented subject matter, to one or more Remote Gaming Servers (RGS) denoted as 103-1 and 103-2 and to licensee's wallet systems denoted as 104-1 and 104-2. Gaming Open Platform 101 is further operatively connected to Games Marketplace 105 configured as a suite of tools designed for both content creators and licensees. Games Marketplace can rely on the platform 101 to provide the necessary abstraction layer between various Remote Game Servers as well as to provide licensee backends.

Gaming Open Platform 101 is configured to aggregate Remote Game Servers from different providers and enable a unified point of integration to licensees.

Gaming system 102 is configured to communicate with Gaming Open Platform 101 as a Remote Gaming Server (RGS) (e.g. via TPI (Third Party Interface) protocol defined by TPI Specification published by the Gaming Standards Association). As will be further detailed with reference to FIGS. 2-13, gaming system 102 is further configured to enable the GaaS-mode of operation and is referred to hereinafter as GPAS (Gaming Platform as a Service). It is configured to enable all necessary game management functions (e.g. executing and resolving game logic, game flows, error flows, regulation requirements, etc.). It is also configured to provide frontend technologies (e.g. GDK) as well as to generate and deliver game clients to players' browsers. GPAS allows games to be authored once and deployed into multiple channels (e.g. enable omni-channel content delivery to desktop, mobile, casino and/or retail environment).

Figure 2:
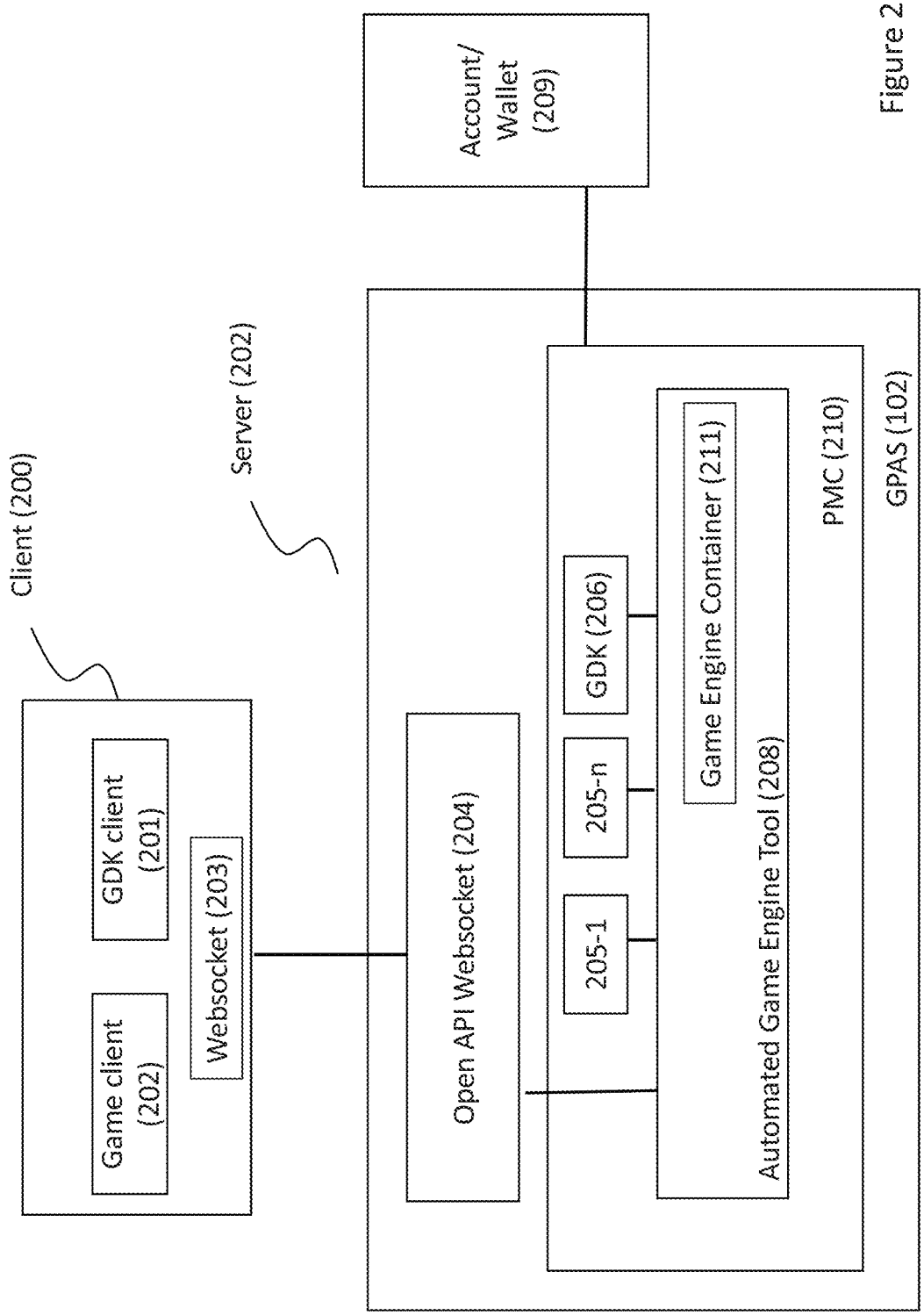
FIG. 2 illustrates a generalized block diagram of a gaming system (GPAS) configured in accordance with certain embodiments of the presently disclosed subject matter.

Referring to FIG. 2, there is illustrated a generalized diagram of GPAS 102 in accordance with certain embodiments of the currently presented subject matter. GPAS is operatively coupled to one or more clients 200 configured to run one or more games clients. GPAS can be further operatively coupled, directly or via platform 101, to licensee/wallet 209. GPAS is implemented on a server and comprises a hardware-based interface 204 configured as an open API websocket enabling communication with websocket 203 of the client 200. GPAS further comprises processor and memory circuitry (PMC) 210 comprising a processor and a memory (not shown separately within the PMC). PMC 210 is operatively coupled to interface 204.

As will be further detailed with reference to FIGS. 2-13, PMC 210 is configured to execute several functional modules in accordance with computer-readable instructions implemented on a non-transitory computer-readable storage medium. Such functional modules are referred to hereinafter as comprised in the PMC. PMC 210 comprises the following functional modules: Automated Game Engine Tool (AGET) 208 operatively coupled to service functional modules 205-1-205-*n*.

Service functional modules 205-1-205-*n* are configured to provide core services necessary for hosting game engines (e.g. random number generation, game history service, state persistence service, message routing service, regulatory compliance services, etc.).

GDK 206 is configured as a suite of tools and technologies that enable game development on the GPAS platform. GDK 206 can comprise GLU (GDK link unit), CLI (Command line interface) and developer library. CLI provides developers with a number of tools needed during the development lifecycle of a game client. GLU can be configured as a Javascript API that is responsible for abstracting the player's browser/device and GPAS from a game, providing required network connectivity and routing message between the game client and the GPAS. The presentation logic of a game client can be built on top of the GLU API. For example, the logic of scaling, layout management, resizing, adapting to orientation change and so forth can be handled by the game client's logic.

AGET 208 comprises the functional modules further detailed with reference to FIG. 3 and, in production mode, one or more Game Engines deployed within one or more game engine containers 211. As further detailed with reference to FIG. 13, Game Engine can be configured as a single file being a sealed unit comprising, typically, a logic for a single game. Each Game Engine can be independently versioned, deployable and upgradeable. It is noted that, optionally, logic for multiple games can be packaged into a single Game Engine Package file. A combination of a game client with a Game Engine configured to run on GPAS constitutes a GPAS game.

It is noted that the teachings of the presently disclosed subject matter are not bound by the GPAS described with reference to FIGS. 1 and 2. Equivalent and/or modified functionality can be consolidated or divided in another manner and can be implemented in any appropriate combination of software with firmware and/or hardware and executed on a suitable device. In certain embodiments GPASs can be implemented in multi-tenancy clustered architecture so that multiple instances of each server component run across multiple server nodes providing both resilience and scalability.

Figure 3:
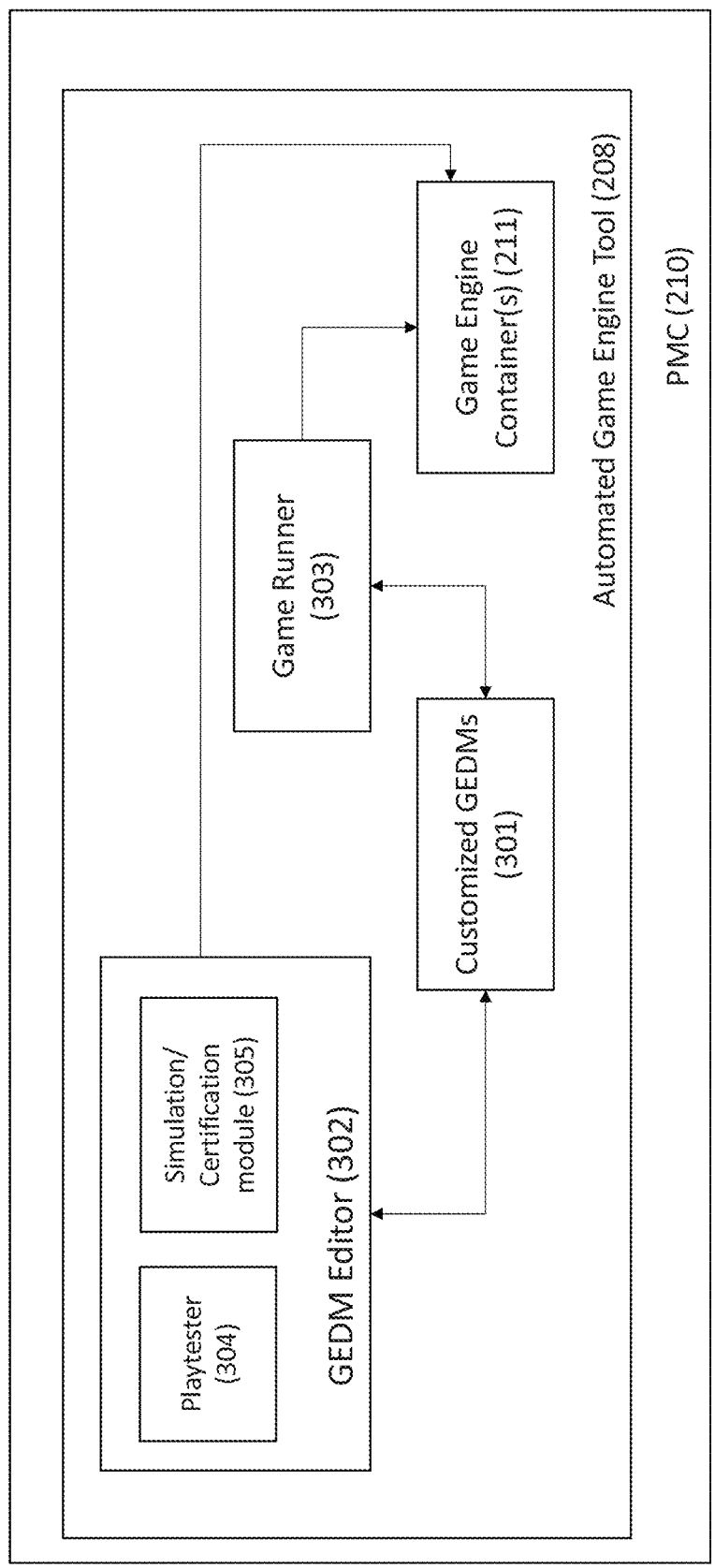
FIG. 3 illustrates a generalized block diagram of an automated game engine tool in accordance with certain embodiments of the presently disclosed subject matter.
Figure 4:
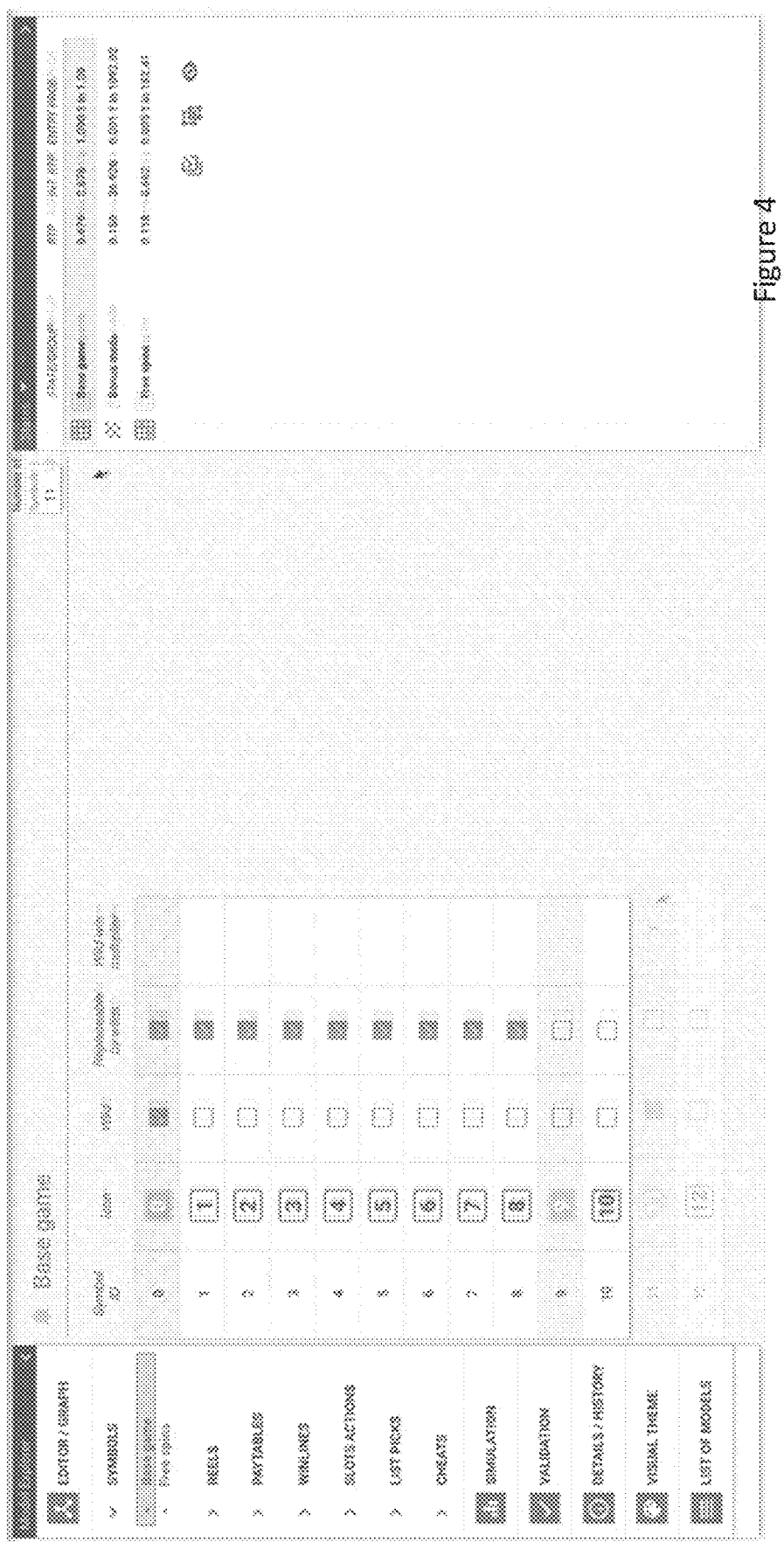
Figure 6:
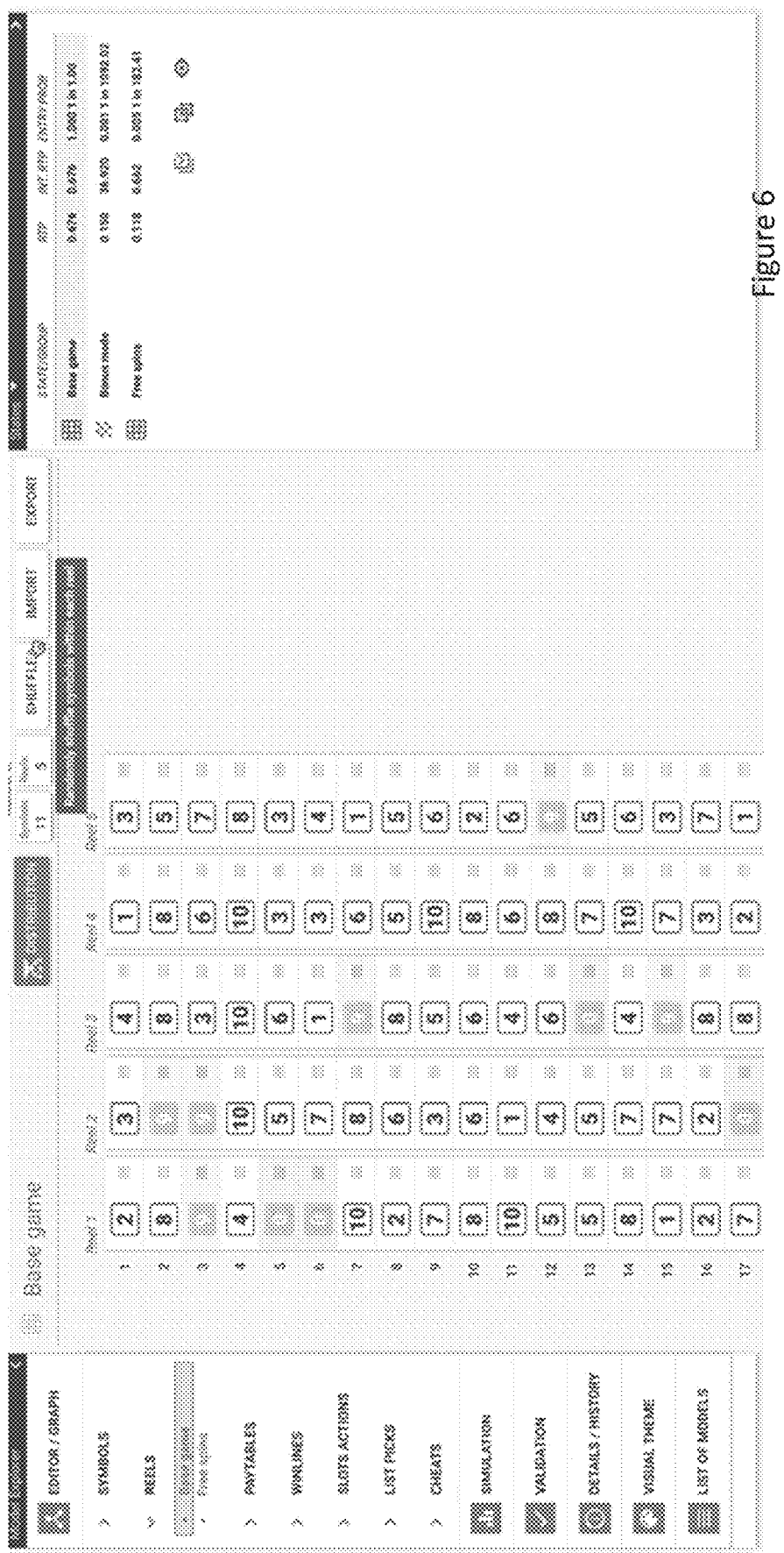
Figure 7:
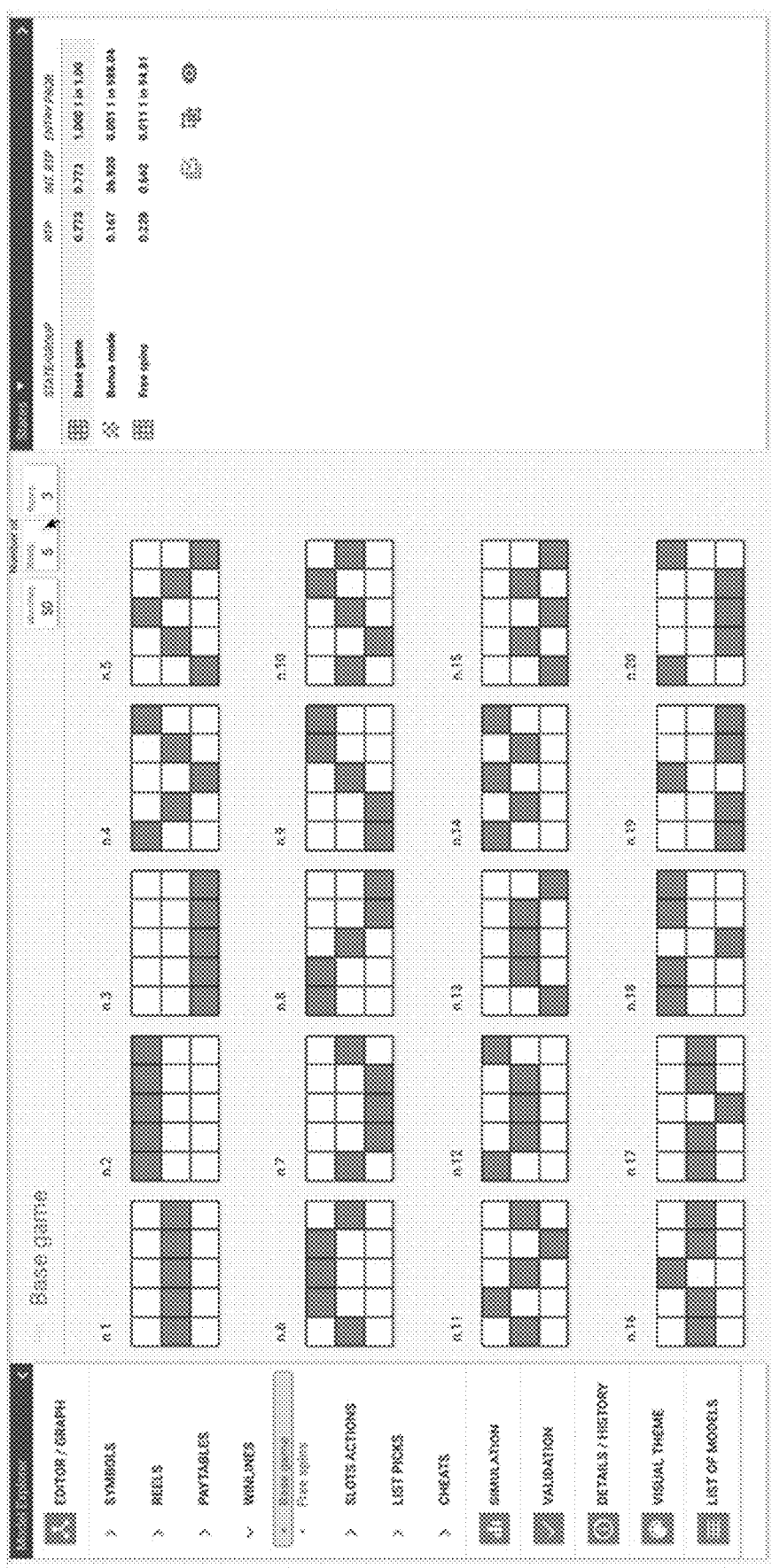

Referring to FIG. 3, there is illustrated a generalized functional diagram of Automated Game Engine Tool (AGET) configured in accordance with certain embodiments of the presently disclosed subject matter.

AGET 208 runs on PMC 210 and can be accessible by a user (e.g. via a graphical user interface (GUI), Application programming interface (API), etc.). As will be further detailed with reference to FIG. 13, at least some of AGET's functional modules can also run in a test environment operatively connected to the GPAS.

Among users of the AGET can be a Game Engine Author—a person or an application that uses the AGET to create Game Engines or to edit existing Engines; a Certifier—a person or an application that uses the AGET to validate and test the specific behaviour of a specific Game Engine; etc. AGET can be configured to allow multiple users to work concurrently, wherein each user can use AGET to create, edit, balance and/or certify a separate game engine.

Further to game engine container(s) 211, AGET 208 comprises the following functional modules: one or more customised game engine data models (customised GEDMs) 301, GEDM editor 302 and game runner 303.

In accordance with certain embodiments of the currently presented subject matter, game models 301 for each of the game engines are derived from a unified Game Engine Data Model (GEDM) with customizable parameters. Unified GEDM is a structured data model of game engines and comprises a generic framework that describes the nodes within the game and one or more of sub-components. Each sub-component is described by a re-usable sub-component model with model parameters specific to a given game mode. By way of non-limiting example, the game modes include slot nodes, list pick nodes, card game modes, scratch card modes, trail modes, etc. A customized GEDM is stored within the AGET as a structured data and not as a code. Customized GEDMs and respectively created Game Engines can thus be manipulated, inspected, and/or queried as data items.

The maths of the all models 301 is unified, while the math-related parameters can be customized per user's specifications. Customization of GEDM parameters results in how a given game is executed and therefore played. Customized GEDM is referred to hereinafter also as a customized game model. A customized game model is configured to fully represent the maths of a single game (from initial creation all the way through authoring, refinement, testing certification and production) and is usable for generating the game engine of the respective single game.

It is noted that a specific, customized GEDM may be unavailable for a user. However, AGET can derive a 'public' view of game model as a portion of GEDM 301 and send the derived portion to a game client with inherited guarantee of consistency with the entire GEDM.

Non-limiting examples of customizable model parameters for slot nodes mode include:
Symbols, reels, winning lines, and payouts;
Customisable payouts for winning lines and scatters;
On-reels features for spins with customisable transforms, including fixed and triggered patterns for example exploding wilds and sticky symbols.

Non-limiting examples of model parameters for list pick nodes mode include:
Player/automatic server choices with single/multiple choices for each game round;
Hidden or real player choice picks for player picks;
Weighted picks with optional pick exhaustion It is noted that the GEDM is itself extensible. Advanced users of the AGET can extend the GEDM. Such extensions to the GEDM require extensions to be made to all functional units that interact directly with the GEDM. Thus, the Game Runner (303) must be extended to interpret the GEDM extensions. Extensions to the GEDM Editor (302), Playtester (304) and Simulation (305) are optional, but failure to update them may render those functions incompatible with the games built upon the extended GEDM.

FIGS. 4-7 illustrate non-limiting examples of screenshots presenting customizable math-related model parameters of slot nodes mode. Namely, illustrated customizable math-related model parameters are symbols in FIG. 4, paytable and transitions in FIG. 5, reels in FIG. 6 and winlines in FIG. 7.

Figure 8:
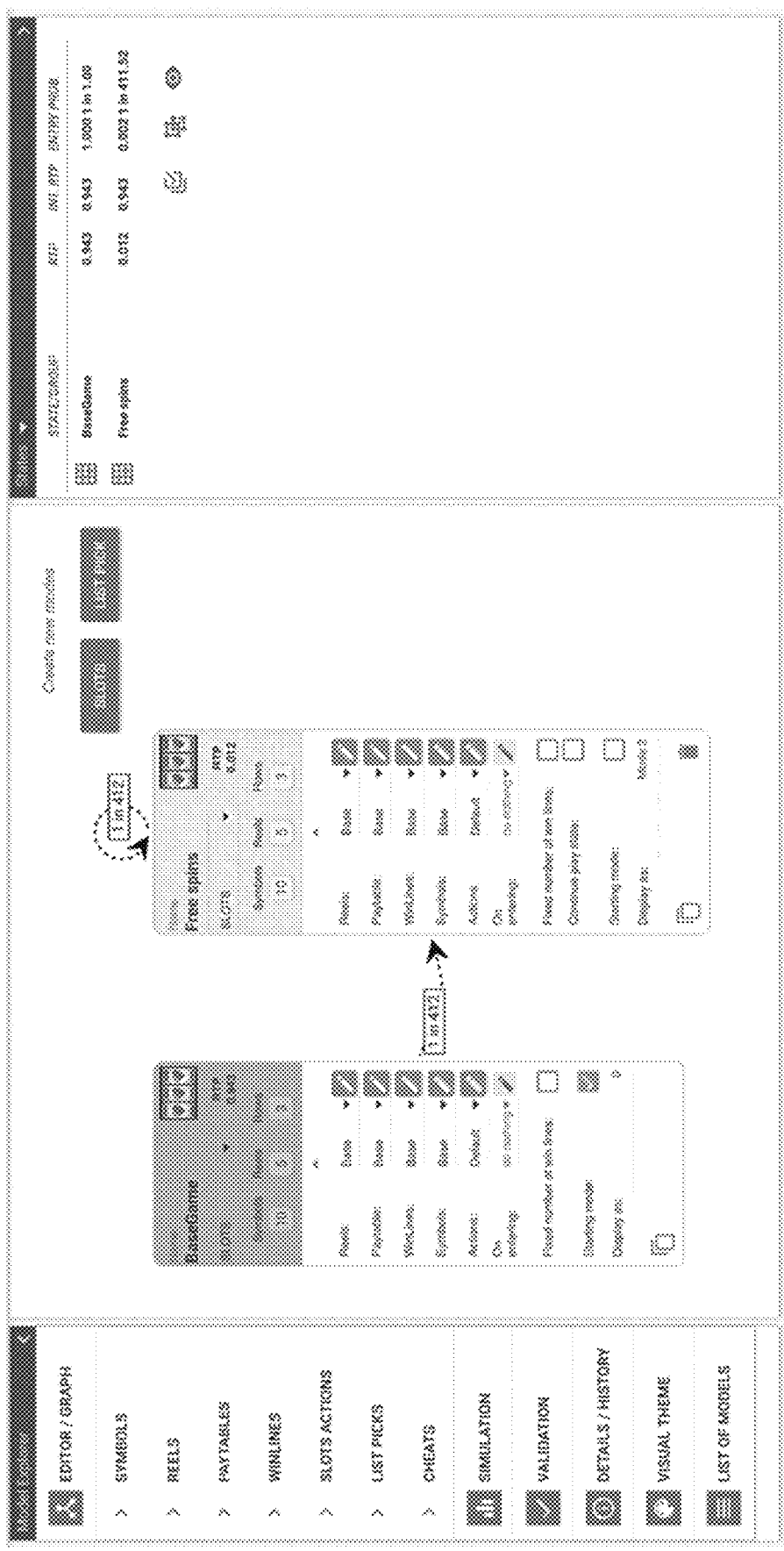
FIG. 8 illustrates an exemplified user interface of GEMD Editor configured in accordance with certain embodiments of the presently disclosed subject matter.

Referring back to FIG. 3, GEDM Editor 302 is configured to enable 'drag-and-drop' GEDM customization. Thus, users are enabled to iterate over the customized game model they are designing, and get instant feedback on the effect of changes as they have been made. FIG. 8 illustrates an exemplified user interface of GEMD Editor 302 enabling GEMD customization for two slots nodes.

GEDM Editor 302 is further configured to provide realtime RTP calculation, enable model sharing and collaboration, and component reuse between games.

GEDM Editor 302 treats customized game models as data, which means that no coding is required for game logic creation. As will be further detailed with reference to FIG. 13, once the customized game model has been created, it can be 'Published' into a Game Engine Package that can then be certified and deployed to any GPAS instance with no need for extra code development.

GEDM Editor 302 comprises playtester 304 and simulation & validation module 305.

Playtester 304 is a functional module enabling automatic generation of a game client in accordance with a designed customized game model. Such a generated game client enables a user to 'playtest' a generated game engine. Playtester is configured to provide game client user interface (UI) that allows a user to instantly play the Game Engine under design. The auto-generated game client can be used as a starting point for creation of the final game client, thus providing a considerable saving of efforts for initial client development.

Figure 9:
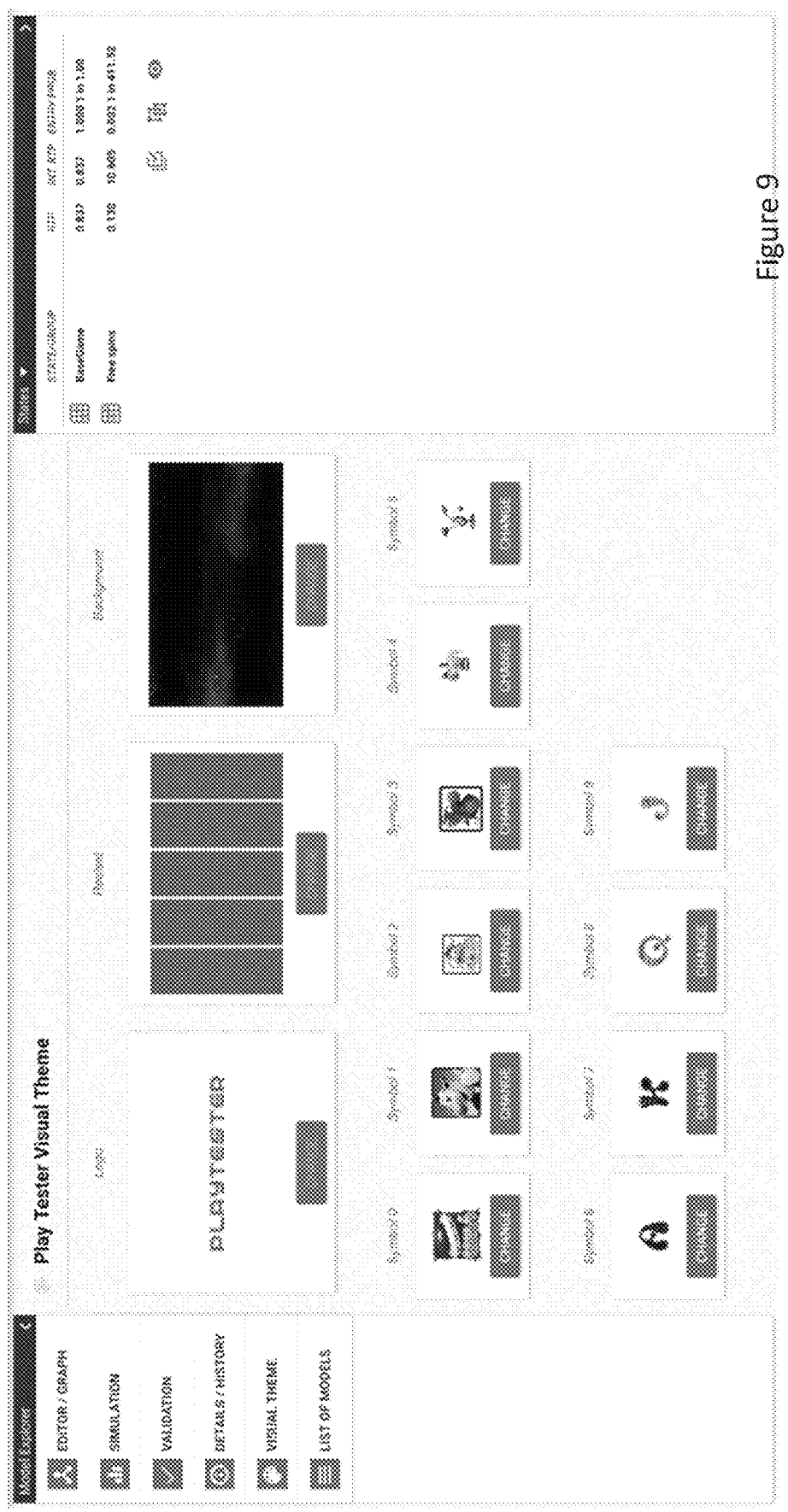
FIGS. 9-10 illustrate non-limiting examples of screenshots presenting "theme image replacement" capabilities of the GEMD Editor configured in accordance with certain embodiments of the presently disclosed subject matter.
Figure 10:

Playtester 304 can be further configured to provide additional capabilities contributing to the ability of Game Engine testing (e.g. Fixable Random Number Generator, running statistics, ability to replace 'Theme' images, etc.) FIG. 9 illustrates playtester presenting theme images which can be replaced by '5 reel' slots game as illustrated in FIG. 10.

Simulation & validation module 305 is configured as a suite of simulation and statistical analysis tools that provide the required statistics for customized game models. Module 305 can comprise a statistic calculator configured to provide numerical solutions to calculate model statistics in real time and to report this to users as theoretical statistics of a given game engine. The statistics calculator comprises analytical algorithms enabling full examination of all possible game states, and is configured to provide information about a given Game Engine as a whole and/or about sub-components within the game engine.

Module 305 is further configured to provide validation both from the perspective of catching errors and from the perspective of compliance to legal regulatory regimes. As a logic of a generated Game Engine corresponds to a customized GEDM, both of these validation functions can be performed in an automated manner. These validations can be node specific (e.g. slots specific) or relate to the whole game. The validation module can further operate in cooperation with other functional modules (e.g. use outputs of Statistics Calculator).

Game runner 303 is configured to execute a play request by reading the respective customized game model and using the model data to determine how the game should play.

Optionally, although not mandatory so, the game runner 303 can be generic, so that the same game runner can be used across different platforms and implementations (including the testing environment). Among advantages of such embodiments is that the games can vary only by customizable parameters of GEDM. Thus, a certification process can be simplified as there will be no code variations between different games.

Game runner 303 can be implemented in a test/editing and/or in a live environments. When implemented in a live environment, the game runner resides within the GPAS and communicates with the service functional modules enabling necessary core services. When implemented in an editing environment, the game runner enables the GEDM editor to perform simulation test runs of the generated game engine.

Figure 11:
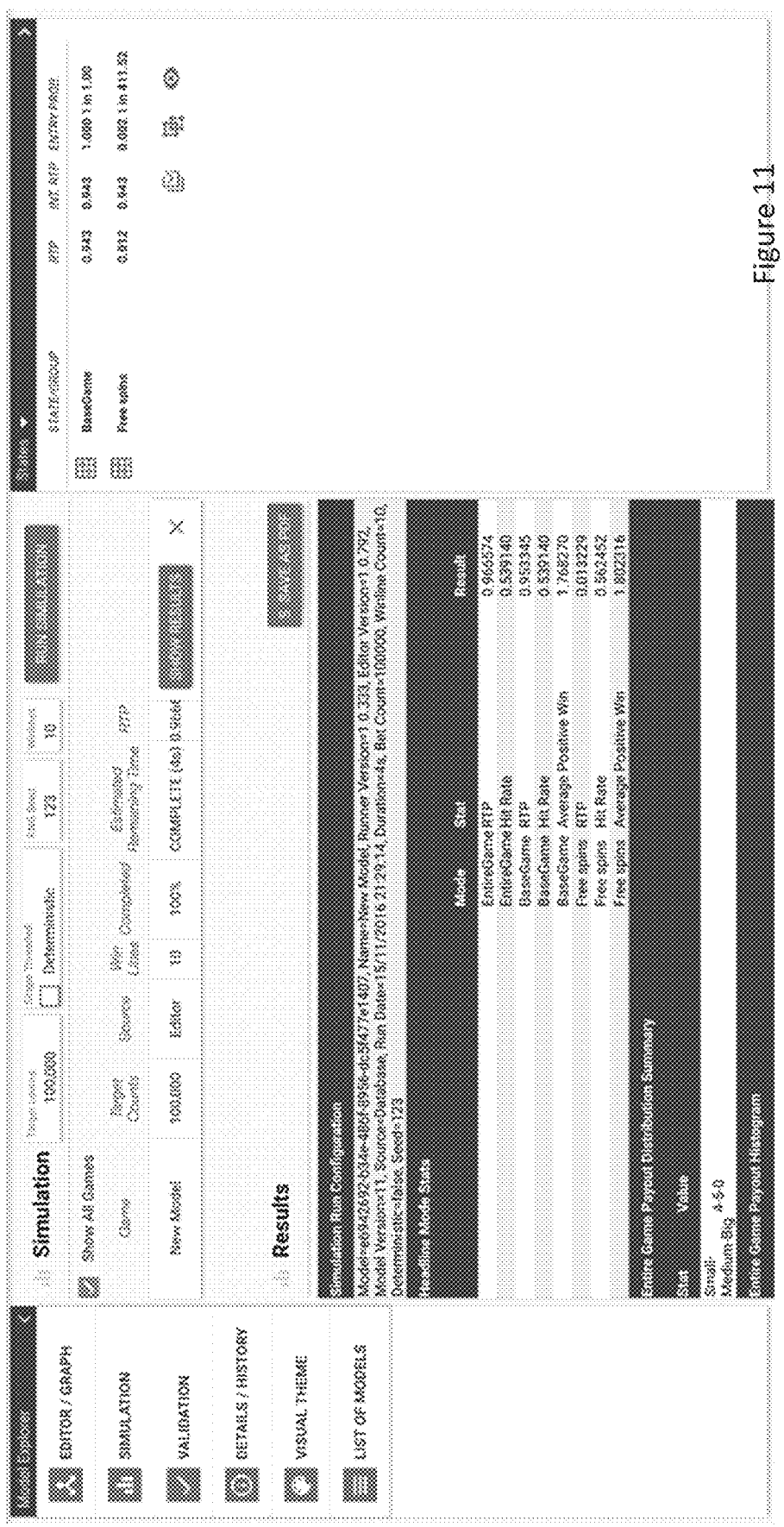
FIG. 11 illustrates an exemplified screenshot of a game runner configured in accordance with certain embodiments of the presently disclosed subject matter.

Game runner 303 can be further configured to collect statistics that are not available through the statistics calculator. Such statistics can be usable both during Game Engine creation and certification. An exemplified screenshot of game runner 303 is illustrated in FIG. 11 presenting both controls to define the simulation run parameters and simulation run results.

It is noted that some of the calculations performed by game runner 303 can be parallelised. In certain embodiments, the calculations can be executed on a low level specialised piece of hardware specifically designed for massive parallel computation (e.g. GPU or FPGA). In such embodiments, the game runner 303 can enable full cycle simulations that test every game state, thus providing measured rather than statistical simulation results. It is further noted that some of measured results (e.g. maximum wins that are important from a gambling regulatory perspective) can be not easy to obtain by other means.

Optionally, the GEDT editor can further comprise a Game Engine automated generator (not shown) configured to run an algorithm to create or optimize the customizable parameters of a given Game Engine. By way of non-limiting example, optimization can be provided using Simulated Annealing optimization techniques to optimise the given Game Engine based on RTP (return-to-player) and perturbing either the symbols that appear on a reel in a slot machine, or payouts for slot machines & scratch cards. The parameters of the cost-function can be used to tune the desired results per user's requirements.

Game Engine optimisation can be performed at multiple scopes, full game or game sub-component. Optionally, the optimisation parameters can be tuned to target a game at specific players, player segments, regions & legal jurisdictions. Game Engine optimisation can optimize GEDM parameters to maximise game play within a defined scenario.

It is noted that the teachings of the presently disclosed subject matter are not bound by the automated Game Engine tool described with reference to FIG. 3. Equivalent and/or modified functionality can be consolidated or divided in another manner and can be implemented in any appropriate combination of software with firmware and/or hardware and executed on a suitable device. Optionally, AGET can be implemented as a standalone entity operating in conjunction with GPAS. Optionally, at least some parts of AGET can be implemented so as to enable web-based functionality.

Figure 12:
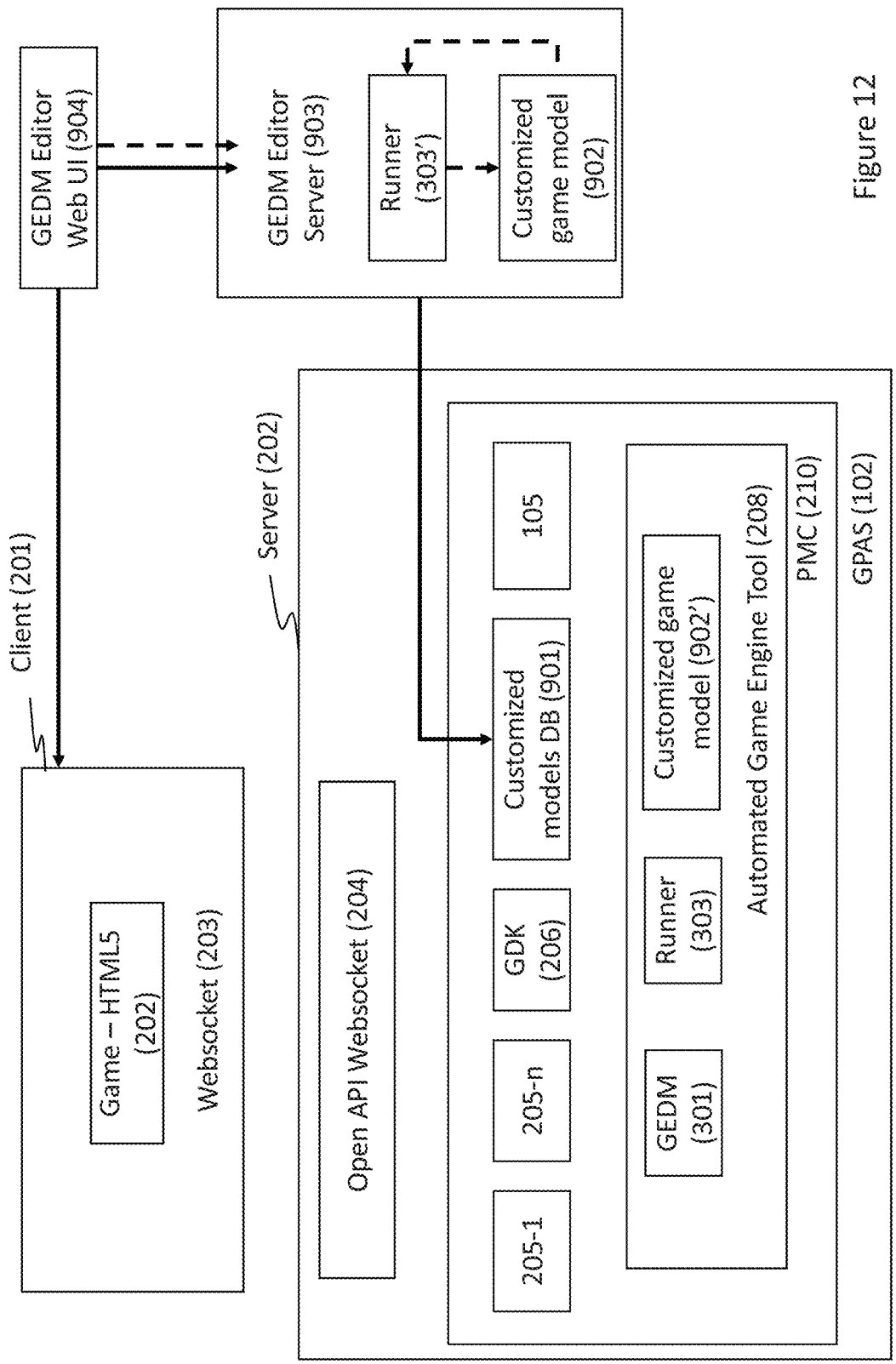
FIG. 12 illustrates a generalized functional diagram of an Automated Game Engine Tool (AGET) configured to operate in a test/editing environment in accordance with certain embodiments of the presently disclosed subject matter.

FIG. 12 illustrates a generalized functional diagram of Automated Game Engine Tool (AGET) configured to operate in a test/editing environment in accordance with certain embodiments of the presently disclosed subject matter.

As illustrated, in the test environment GEDM editor runs on a separate server 903 available to a user via GEDM editor Web UI 904. Game runner 303' running on server 903 enables a user to perform simulation test runs responsive to customizing GEDM parameters. It is noted that game runners 303 and 303' are instances of the same piece of software running on different platforms. Dashed lines illustrate the process of editing (including simulating). When the customized game model is completed (i.e. respective game engine meets a user's specification of the game), it can be uploaded to a database 901 of customized models, and can be further retrieved therefrom for game engine packaging usable in a live environment. Bold lines illustrate the launching process.

Figure 13:
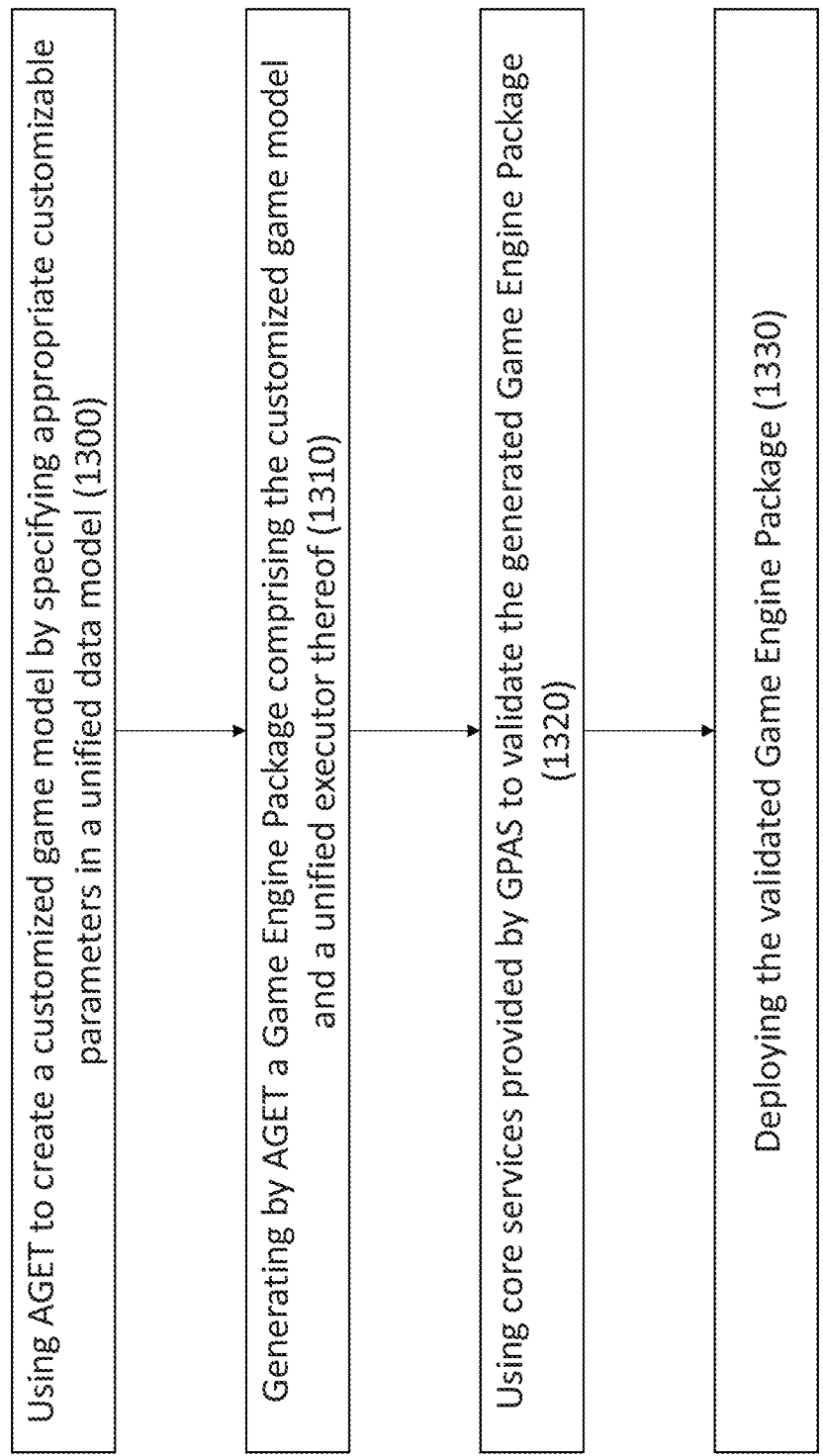
FIG. 13 illustrates a generalized flow chart of operating the GPAS in accordance with certain embodiments of the presently disclosed subject matter.

Referring to FIG. 13, there is illustrated a generalized flow chart of operating GPAS in accordance with certain embodiments of the presently disclosed subject matter.

At the beginning of the process, AGET enables creating (1300) a customized game model by specifying appropriate customizable parameters (e.g. defining nodes for a slot-based game) in a unified data model GEDM. AGET functional modules can be implemented within a web application. Such web application enables creating and updating the customized game model and storing it (e.g. in an XML format) within the database (901) of customized game models.

Optionally, creating can include a refining phase where a game designer can iteratively modify the customized model. This iterative design process can comprise the following repeating operations:

changing the customizable parameters using the GEDM editor,
assessing impact on game play stats using the Statistics Calculator,
assessing impact on more complex stats using the Runner in the test environment;
assessing impact on game play 'feel' using the playtester (or, optionally, a real client);
repeating the operations above until the resulting game engine meets user's specification of the individual respective game.

Once the customized game model meets the user's requirements, AGET generates (1310) a Game Engine Package comprising the customized game model and a unified executor thereof (instance of game runner). Optionally, the package can further include one or more custom plugins. The package can be created as a versioned zip file and can be stored in AGET. It is noted that the Game Engine Package is the unit of certification and exists once per Game Engine. That package can then be deployed unchanged to multiple GPAS instances (QA, or multiple production environments).

Among advantages of such packaging is capability of updating the game runner code with no risk to already packaged engines as they are left unchanged and run the version of the runner that they were packaged with. Among further advantages is enabling API compatibility with traditional 'fully coded' maths engines, thus allowing flexibility over engine development methodology.

AGET further uses core services provided by GPAS to validate (1320) the generated Game Engine Package. Validation can be provided from a QA (Quality Assurance) perspective. Optionally, the package can be certified by a 3rd party testing entity.

Upon validation, AGET enables deploying (1330) the validated Game Engine Package which can be run in any compatible engine container in one or more GPAS instances. It is noted that multiple Game Engine Packages can be deployed to a single GPAS instance. It is further noted that the Game Engine Package can be deployed and run in any Game Platform implementation that conforms to the Game Package API and requirements. For example, further to online implementation, the validated Game Engine Package can be deployed onto a physical, Retail Cabinet and run it locally there. In such a case, core services like 205-1-205-n can be provided locally in the cabinet or provided remotely by GPAS or another platform.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a computer-based gaming system, the method comprising:
generating, by the gaming system, a customized game engine data model (GEDM) configured to represent a math of a given game, wherein the customized GEDM is derived from a unified game engine data model (GEDM) by defining customizable parameters meeting a user's specification and related to the math of the given game, and wherein the unified GEDM specifies a math unified for all customized GEDM derivable from the unified data model by defining the customizable parameters related to the math;
generating, by the gaming system, a Game Engine Package comprising the customized GEDM and an executor thereof, wherein the executor is unified and applicable to any customized GEDM derivable from the unified data model;
validating the generated Game Engine Package; and
deploying the validated Game Engine Package to one or more instances of the gaming system;
wherein the validated Game Engine Package is configured as a single sealed unit comprising a logic for a one or more games.

2. The method of claim 1, wherein the Game Engine Package further comprises one or more plugins.

3. The method of claim 1, wherein the single sealed unit is a versioned zip file.

4. The method of claim 1, further comprising:
prior to deploying the Game Engine Package, generating by the gaming system a game client in accordance with the customized GEDM; and
using the generated game client to enable a user to playtest the generated Game Engine Package.

5. The method of claim 1, wherein the generating the customized GEDM comprises a refining phase of iteratively modifying the customized model.

6. The method of claim 1, further comprising simulating, by the gaming system, an execution of the customized GEDM prior to generating the Game Engine Package.

7. The method of claim 1, further comprising, wherein validating provided with the help of core services supplied by the gaming system.

8. The method of claim 7, wherein the core services are selected from a group consisting of random number generation, state persistence service, message routing service and regulatory services.

9. The method of claim 1, further comprising deploying the Game Engine Package in a retail environment or bingo environment.

10. A computerized method of providing a service related to generating a game deployable to a gaming system, the method comprising:
- enabling a user to use the gaming system to generate a customized game engine data model (GEDM) configured to represent a math of a given game, wherein the customized GEDM is derived from a unified game engine data model (GEDM) by defining customizable parameters meeting a user's specification and related to the math of the given game, and wherein the unified GEDM specifies a math unified for all customized GEDM derivable from the unified data model by defining the customizable parameters related to the math;
- generating, by a game system, a Game Engine Package comprising the customized GEDM and an executor thereof, wherein the executor is unified and applicable to any customized GEDM derivable from the unified data model;
- validating the generated Game Engine Package; and
- enabling the user to deploy the validated Game Engine Package to one or more instances of the gaming system;
- wherein the validated Game Engine Package is configured as a single sealed unit comprising a logic for a one or more games.

11. A gaming system comprising a processing and memory circuitry (PMC) operatively connected to a user interface, wherein the PMC is configured to:
- generate a customized game engine data model (GEDM) configured to represent a math of a given game, wherein the customized GEDM is derived from a unified game engine data model (GEDM) by defining customizable parameters obtained via the user interface and related to the math of the given game, and wherein the unified GEDM specifies a math unified for all customized GEDM derivable from the unified data model by defining the customizable parameters related to the math;
- generate a Game Engine Package comprising the customized GEDM and an executor thereof, wherein the executor is unified and applicable to any customized GEDM derivable from the unified data model;
- validating the generated Game Engine Package; and
- deploy the validated Game Engine Package to one or more instances of the gaming system;
- wherein the validated Game Engine Package is configured as a single sealed unit comprising a logic for a one or more games.

12. The system of claim 11, wherein the Game Engine Package further comprises one or more plugins.

13. The system of claim 11, wherein the PMC is further configured to:
- prior to deploying the Game Engine Package, generate a game client in accordance with the customized GEDM; and
- use the generated game client to enable a user to playtest the generated Game Engine Package.

14. The system of claim 11, wherein the PMC is further configured to simulate an execution of the customized GEDM prior to generating the Game Engine Package.

15. The system of claim 11, wherein validating provided with the help of core services supplied by the gaming system.

16. The system of claim 15, wherein the core services are selected from a group consisting of random number generation, state persistence service, message routing service and regulatory services.

17. A computer program product implemented on a non-transitory computer usable medium and comprising computer readable program code for performing the operations of:
- generating, by a gaming system, a customized game engine data model (GEDM) configured to represent a math of a given game, wherein the customized GEDM is derived from a unified game engine data model (GEDM) by defining customizable parameters meeting a user's specification and related to the math of the given game, and wherein the unified GEDM specifies a math unified for all customized GEDM derivable from the unified data model by defining the customizable parameters related to the math;
- generating, by the gaming system, a Game Engine Package comprising the customized GEDM and an executor thereof, wherein the executor is unified and applicable to any customized GEDM derivable from the unified data model;
- validating the generated Game Engine Package; and
- deploying the validated Game Engine Package to one or more instances of the gaming system
- wherein the validated Game Engine Package is configured as a single sealed unit comprising a logic for a one or more games.

* * * * *